United States Patent [19]

Woolfson et al.

[11] 4,038,588
[45] July 26, 1977

[54] PRECISION AMPLITUDE CONTROL SYSTEM FOR A HIGH Q TORSION PENDULUM

[75] Inventors: Martin G. Woolfson, Baltimore; Robert H. Plath, Linthicum Heights, both of Md.

[73] Assignee: The United States of America as represented by the Secretary of the Air Force, Washington, D.C.

[21] Appl. No.: 655,031

[22] Filed: Feb. 3, 1976

[51] Int. Cl.² .............................................. B64C 17/02
[52] U.S. Cl. ................................... 318/648; 318/127; 318/599; 58/130 C
[58] Field of Search ............... 318/648, 599, 611, 341, 318/127; 58/130 R, 130 C, 130 E, 29, 30, 31, 32

[56] References Cited

U.S. PATENT DOCUMENTS

| | | | |
|---|---|---|---|
| 3,051,883 | 8/1962 | Smith | 318/611 |
| 3,704,407 | 11/1972 | Lindsey | 318/648 |
| 3,883,788 | 5/1975 | Storey, Jr. | 318/648 |
| 3,947,742 | 3/1976 | Van Acker | 318/611 |

*Primary Examiner*—B. Dobeck
*Attorney, Agent, or Firm*—Joseph E. Rusz; William Stephanishen

[57] ABSTRACT

An amplitude control apparatus utilizing an oscillator with an amplitude regulation loop to provide positive feedback to the oscillator and thereby providing zero amplitude error.

6 Claims, 9 Drawing Figures

PRECISION AMPLITUDE CONTROL SYSTEM FOR A HIGH Q TORSION PENDULUM

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to control systems, and in particular to a precision amplitude control system for a high Q pendulum.

In the prior art, the requirements for the electrical control of pendulums are especially well known, particularly in the areas of electric clocks and similar devices. It is well-known that pendulum devices of high precision have been built but even in the best of these, it has not been possible to eliminate the effects of the variations in the driving impulses to the pendulum and the friction in the suspension. The use of feedback in prior basic electro-mechanical systems resulted in a reduction in Q for the circuit. Some control systems utilized continuous tachometer and position feedback devices that add undesirable damping functions which result in additional power loss in the system. The present invention provides a precision amplitude control apparatus which maintains high Q circuit and operates on reduced power consumption.

SUMMARY

The present invention utilizes an oscillator with an amplitude regulation loop to drive a high Q torsion pendulum. The pendulum is driven by a brushless DC torque motor with feedback data provided by a shaft encoder. The encoder output pulses indicate when the pendulum is crossing through the zero reference position and through a preset reference amplitude. The processing in a pulse width loop shaping network maintains loop stability while detecting errors in peak amplitude. The motor is driven by a pulse width modulator that maintains motor excitation 90° out of phase with pendulum position for optimum utilization of power. The loop automatically adjusts motor drive for variations in system Q.

It is one object of the present invention, therefore, to provide an improved amplitude control apparatus which utilizes a feedback loop and maintains a high Q system.

It is another object of the invention to provide an improved amplitude control apparatus utilizing non-continuous feedback data to maintain loop stability.

It is yet another object of the invention to provide an improved amplitude control apparatus having increased system reliability and reduced power consumption.

It is still another object of the invention to provide an improved amplitude control apparatus wherein peak amplitude is maintained to 0.2 milli-radians for a pendulum deflection of ± radian.

These and other advantages, objects and features of the invention will become more apparent from the following description taken in connection with the illustrative embodiment in the accompanying drawings.

DESCRIPTION OF THE PREFERRED EMBODIMENT

Figure 1:
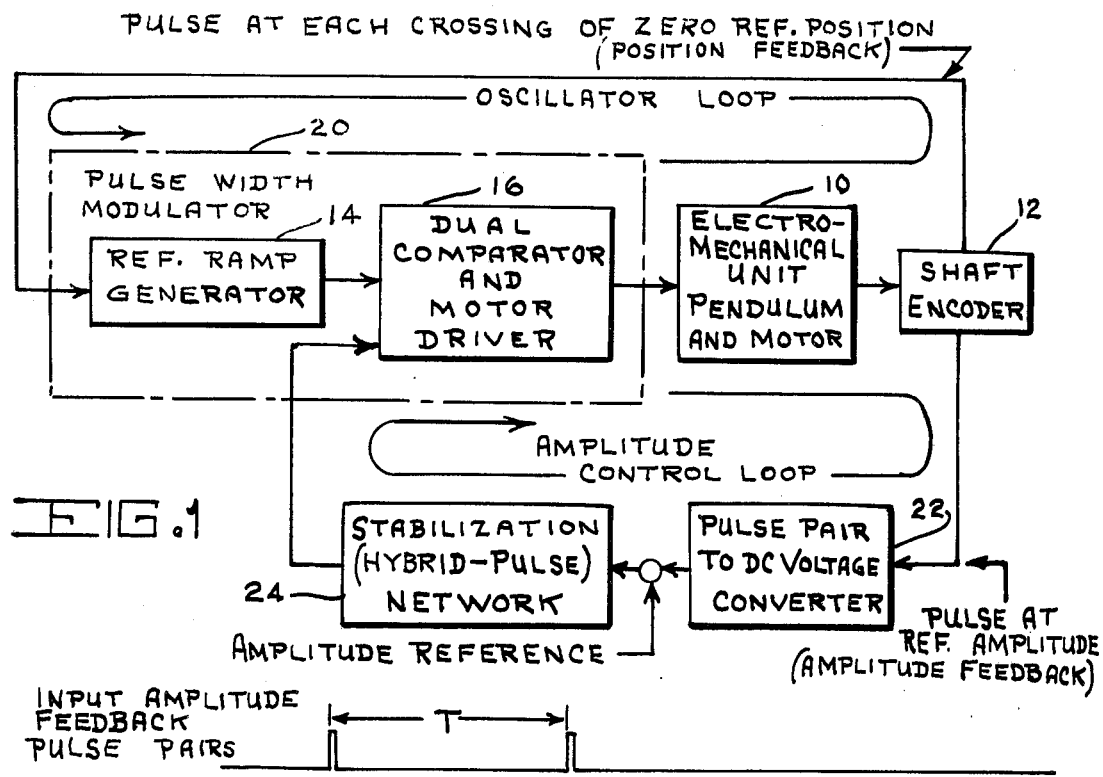
FIG. 1 is a block diagram of the amplitude control apparatus in accordance with the present invention.

Referring now to FIG. 1, there is shown a block diagram of the amplitude control apparatus having an oscillator loop and an amplitude regulation loop.

The oscillator loop contains a high Q torsion pendulum which is driven by a brushless DC torque motor, both of which are contained in electro-mechanical unit 10. The frequency of oscillation is controlled solely by the mechanical constants $\sqrt{K/J}$ of the pendulum. Feedback signals, pulses at the zero reference amplitude, are derived from shaft encoder 12 which is connected to the pendulum and motor 10. The position signal is a positive pulse that occurs each time that the oscillator swings through the zero reference position. The amplitude signal is a positive pulse indicating that the oscillator amplitude is passing through a given reference amplitude. Since the amplitude signals occur near the peak of the oscillator swing, they occur in pulse pairs.

The pulse width modulator 20 which is connected to the pendulum and motor 10 comprises a reference generator 14 and a comparator/motor driven unit 16. Position feedback provides positive feedback for the oscillator loop by controlling the reference ramp generator 14 which is connected to the pulse width modulator motor driver 16. This reference ramp ensures that the pulse width modulator 20 will provide a motor drive voltage that lags the oscillator position by 90°, (motor drive pulses are centered about the zero reference position), to maintain the most efficient use of motor power. The oscillator is driven with full motor drive power until amplitude is increased to the point where amplitude feedback pulses occur. At this point, the amplitude loop is closed and begins to control pulse width modulator output which reduces motor drive to that required to maintain a constant preset pendulum amplitude.

The amplitude feedback occurs when a pair of overshoot pulses are generated indicating that the pendulum amplitude has exceeded that the preset reference. Time spacing between the first and second pulses of each pair is a measure of pendulum amplitude. These pulses are generated each half cycle at the peaks of pendulum deflection. The control circuit 22 transforms each pulse pair into a pulse width whose average DC level is compared with an amplitude reference voltage to form an amplitude error signal. The magnitude of this reference voltage determines the actual regulation amplitude of the pendulum. The error signal is integrated, transformed into a pulse width and combined with the pendulum amplitude pulse width in a feed forward circuit 24 that controls the charge time of a hold circuit whose output is the control voltage for the pulse width modulator 20.

The hold circuit is discharged each time the first of the amplitude pulse pairs occur and is recharged until the second occurs. The start of the charge time is controlled by the output of the error detector. When the error detector output settles to a constant value the loop is operating with zero amplitude error.

If the second pulse of the overshoot pulse pair does not occur, indicating that peak amplitude is below the required regulation level, the hold circuit is not charged and motor continues to be driven with maximum drive. Initially, a few pendulum overshoots of greater than regulation amplitude are necessary to drive the error integrator from its initial value before complete amplitude control can occur.

Integration of the overshoot pulse widths is necessary to extract the average DC value. However, stability dictates that the amplitude control loop network have a zero slope in the region of loop crossover. Both of these conditions are satisfied by the unique integrator-pulse feedforward network that provides a true integration of the pulse widths but overall is effectively a zero slope at the crossover frequency of the loop. Use of the integrator as an error detector permits operation of the control loop with zero amplitude error for a range of electromechanical circuit Q's limited only by the capability of the drive motor.

Figure 2:
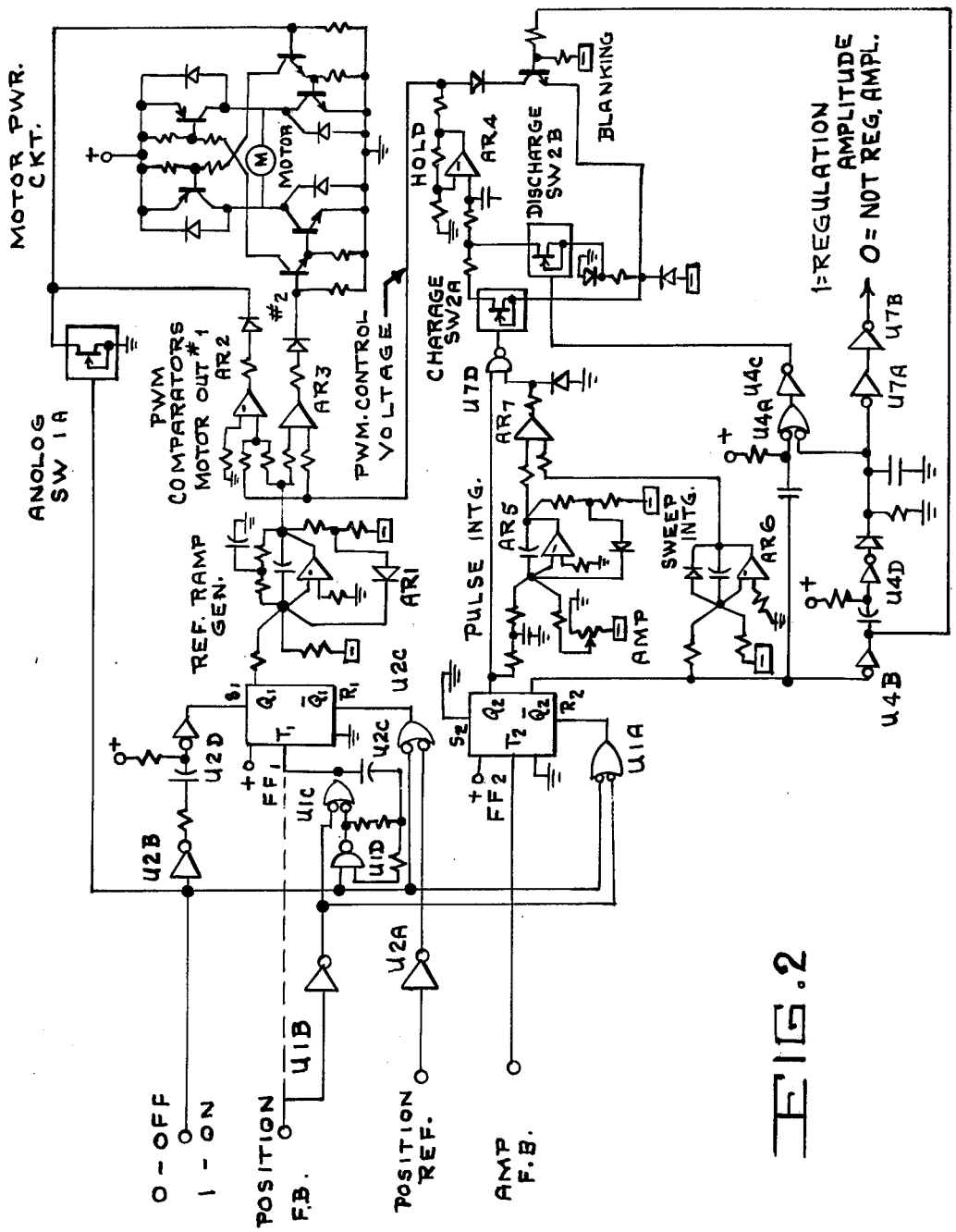
FIG. 2 is a schematic diagram of the amplitude control apparatus with the amplitude control loop.
Figure 3:
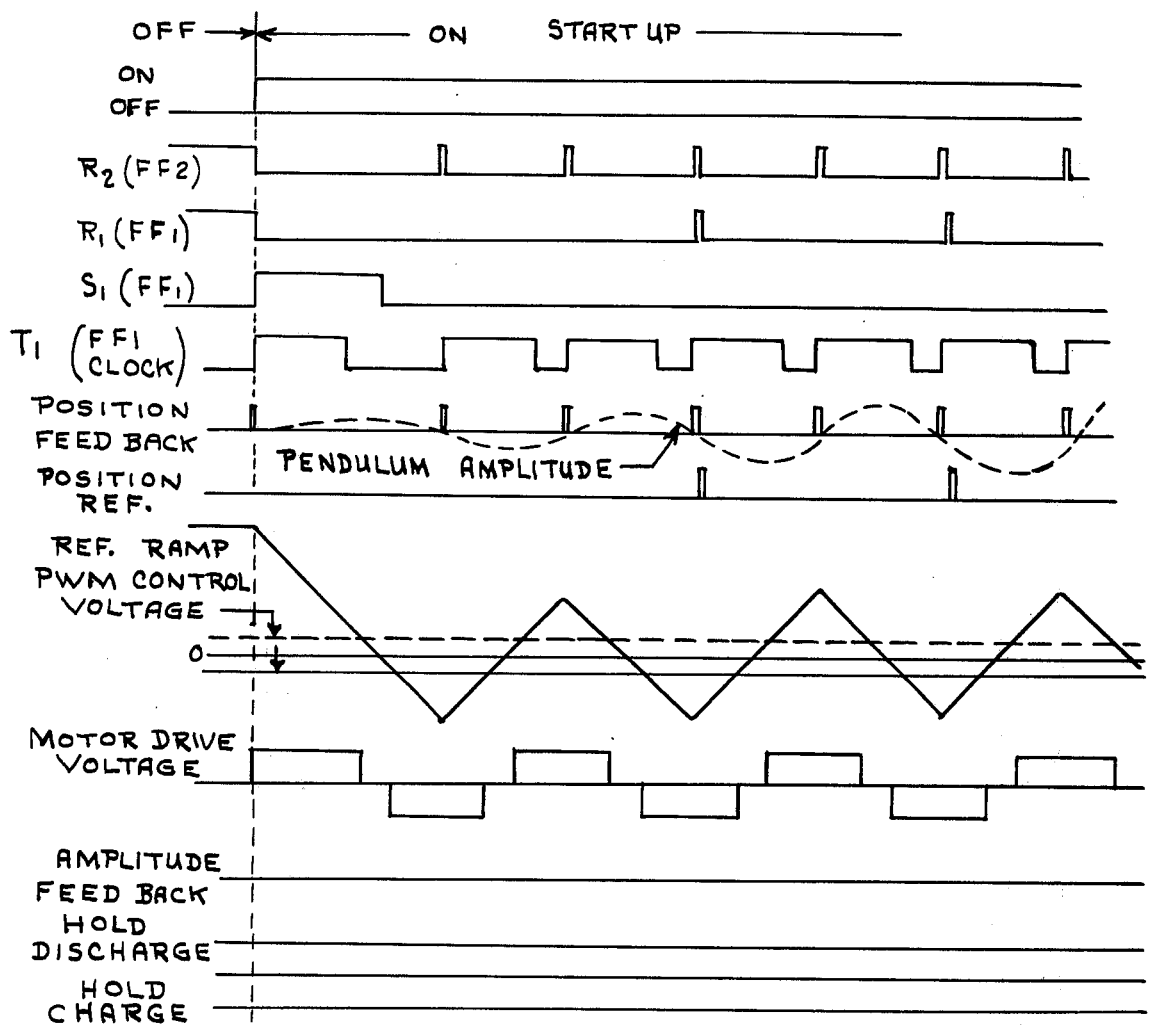
FIG. 3 is a graphical representation of the start-up waveforms and a timing diagram for the amplitude control apparatus.
Figure 4:
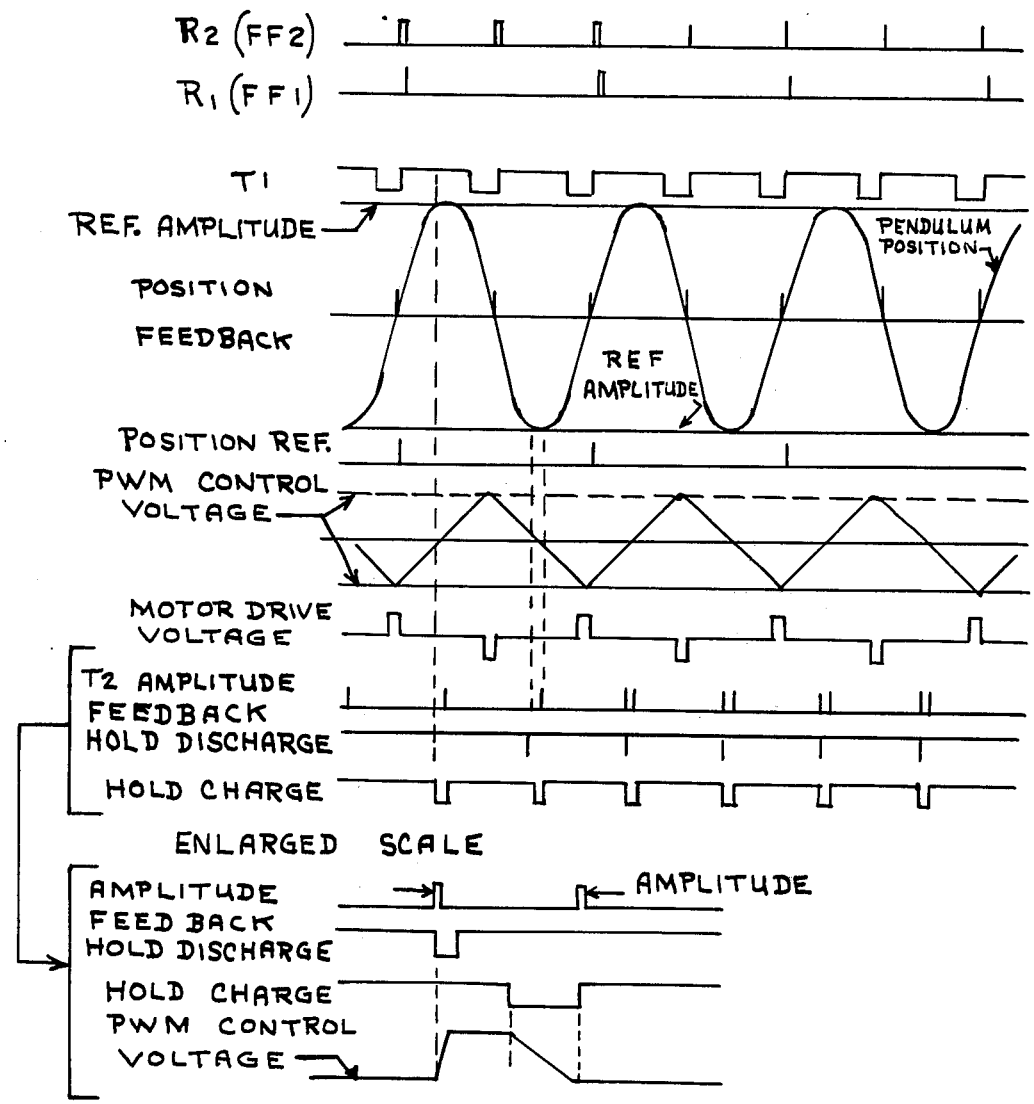
FIG. 4 is a graphical representation of the operating waveforms during amplitude regulation.

There is shown in FIG. 3 the startup waveforms and timing diagram for the amplitude control apparatus and FIG. 4 illustrates the essential waveforms when operating at regulation amplitude. The waveforms of FIGS. 3 and 4 are referenced to the schematic diagram of the amplitude control apparatus shown in FIG. 2.

Turning now to FIG. 2, there is shown amplitude control apparatus which, before system startup and with the power on, is initialized and all inputs are at logic 0. The "0" Off input performs the following four functions:

1. It provides a low input to turn on analog switch 1A which removes motor drive signal from the motor control 1 output to the motor power circuits.
2. It disables the auxiliary start multi-vibrator.
3. It holds the Flip Flop 1 in the reset condition through gate U2C.
4. It holds Flip Flop 2 in the reset condition through gate U1A.

At startup, OFF-ON input at terminal 10 is switched to a logic. 1. Immediately analog switch 1A opens to provide full drive to the motor power circuits and the auxiliary start multi is enabled. In addition, through gates U2B and U2D a wide set pulse is sent to Flip Flop 1 to start the reference ramp generator AR1 from its positive limit condition.

During system operation, zero crossing pulses are used to synchronize the free running, auxiliary start, multi that clocks flip flop 1 each time the system passes the zero reference position. In addition, it provides a reset pulse to flip flop 2 will already be in the reset condition each time that a zero crossing pulse is received. A position reference pulse is generated each time that the system deflects to the reference side. If necessary, it resets flip flop 1 to synchronize it with the system.

The amplitude feedback pulses provide the amplitude feedback that indicates when system motion is passing through a given reference amplitude. Since the amplitude feedback pulses occur near the peak of system motion, they occur in pulse pairs, onee each half cycle. The time spacing between the first and second pulse of each pair is a measure of system amplitude. The pulse pairs clock flip flop 2 to generate a pulse width equal to the spacing of successive pulses of each pair.

The reference ramp generator, AR-1 is driven by the output of flip flop 1, as it is clocked by the zero crossing pulse, and a negative reference. Its output is a positive and negative going ramp, symmetrical about zero. This is the reference voltage for the pulse width modulator motor drive. During startup, the pulse width modulator control voltage is held fixed to provide maximum motor drive. The pulse width modulator has two comparators AR-2 and AR-3 which compare the reference ramp and the control voltage. When the amplitude of the reference ramp exceeds the control voltage, a voltage supplied by the comparators drives the motor power circuits. The polarity of motor voltage is determined by the polarity of the reference ramp. The motor drive voltage is pulse width modulated by varying the amplitude of the control voltage.

The pulse detection circuit takes the pulse width outputs from flip flop 2 and extracts the average DC value to determine actual system amplitude. It compares this DC value with an amplitude reference voltage and integrates the resultant error signal in AR-5. At the start of each pulse width, integrator AR-6 ramps positive at a fixed rate. When the amplitude of this ramp exceeds the integrated error signal, the output of comparator AR-7 switches positive and through Nand gate U7D provides a logic 0 to the input of analog SW2A to charge the hold circuit from its initial condition state until the pulse width is toggled off by the second amplitude feedback pulse. The hold circuit output, the pulse width modulator control voltage, has now been updated for the next half cycle of system operation. At the start of each pulse width, i.e. when the first amplitude feedback pulse occurs, while the amplitude error signal is being integrated, a discharge pulse generated by a one shot gate (½ of U4A) and through inverter gate U4C provides a logic 0 pulse to discharge the hold circuit through analog switch 2A and return the pulse width modulator control voltage to its initial condition state.

In addition, a one shot using inverter gate U4D and the other half of U4A is reset at the start of each pulse width. If an amplitude feedback pulse pair is missed, once the system has been up to amplitude, this one-shot times out and discharges the hold circuit to provide full motor control voltage.

The regulation amplitude signal that indicates when amplitude control is functioning is taken from one shot input terminal on U4A. The signal at this circuit location is either being reset to a logic 1 or decaying toward a logic 0. Therefore, it must be passed through inverter gates U7A and U7B to preserve the polarity and provide a solid logic 1 for the regulation amplitude signal.

The output of the hold circuit is the pulse width modulator control voltage. Before the system is near regulation amplitude, no amplitude feedback pulses are received and the control voltage is held at its initial condition level to provide full motor drive voltage. As the system nears regulation amplitude, the amplitude feedback pulse pairs are generated and processed in the pulse error detector to control the level of pulse width modulator control voltage through the hold circuit. This control voltage is updated each half cycle when system deflection is at its peak. It is then held for use in the pulse width modulator until it is updated at the next deflection peak.

In the region where the reference ramp voltage for the pulse width modulator is passing through zero, it can, under some conditions, exceed the reset value of the control voltage. This condition would cause motor drive pulses to occur at the wrong time and/or cause the power bridge of the motor driver to momentarily short line to ground. In order to prevent this, a blanking transistor Q1 pulls the control voltage to a negative level while the hold circuit is in the discharged condition and the reference ramp is passing through the region near zero volts.

The auxiliary start multi supplied pseudo-zero crossing pulses at startup if actual zero crossing pulses are not generated because this reference position is passed at near zero velocity or because of zero position misalignment. The frequency of this multi is lower than that of the system. While it will not drive the system to full amplitude, it will deflect the system to sufficient amplitude to cause actual zero crossing pulse generation. Once zero crossing pulses occur they they syncronize the auxiliary start multi to actual system frequency and regulation amplitude will result.

Figure 6:
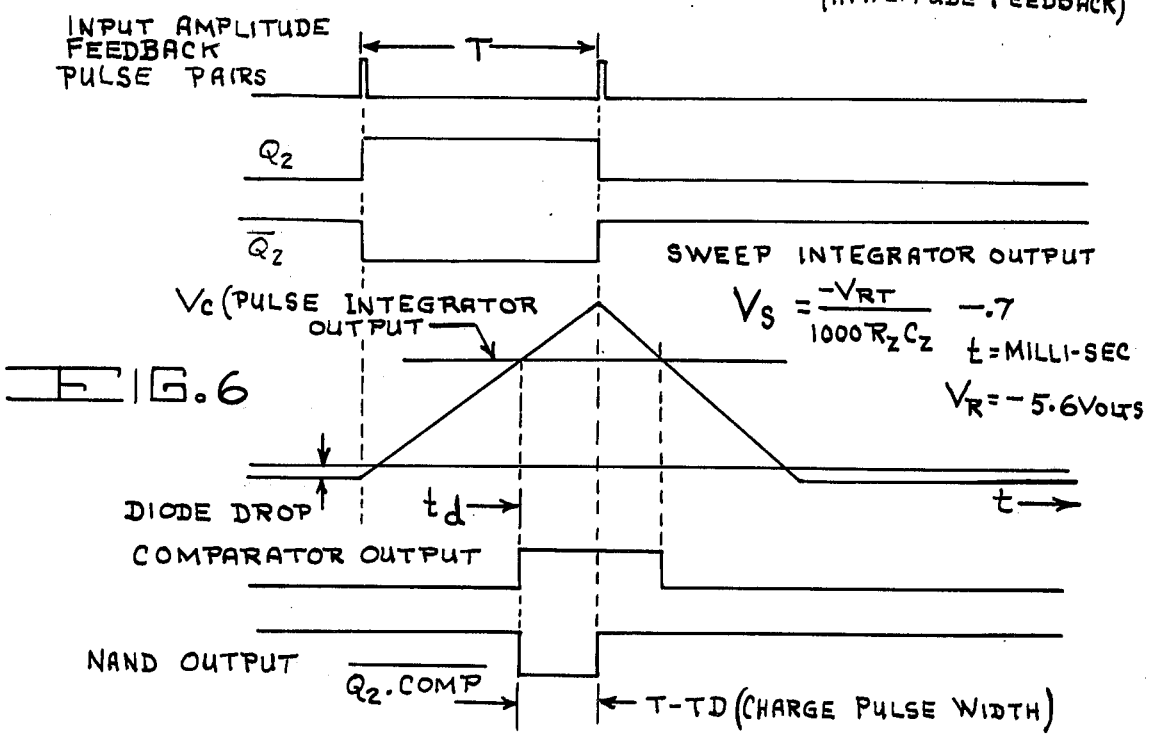
FIG. 6 is a graphical representation of the waveforms in the pulse width integrator and stabilization network.
Figure 5:
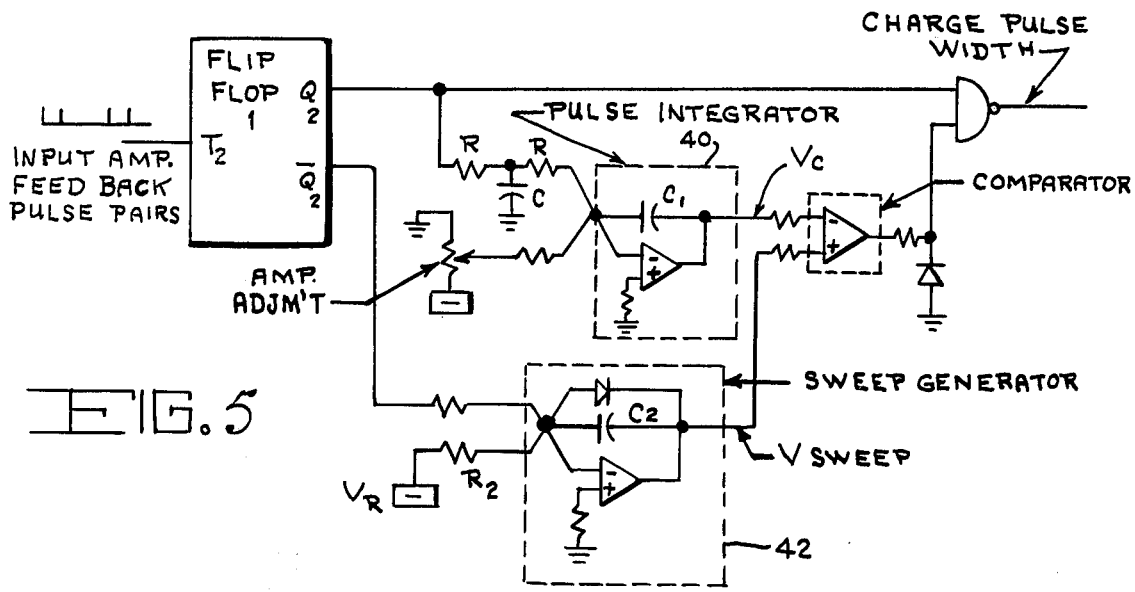
FIG. 5 is a schematic diagram of the pulse width integrator and stabilization network.

There is shown in FIG. 5 a pulse width integrator and stabilization network. The input to this circuit is the amplitude feedback pulse width which is proportional to the peak amplitude of the controlled pendulum. The output is a charge pulse width for a hold circuit that develops the control voltage for the pulse width modulator to drive the pendulum motor. This circuit includes a pulse integrator 40 to extract the DC value of the feedback pulsewidths, subtract this DC value from the amplitude reference voltage, and integrate the resultant error. The output of a sweep integrator 42; which is enabled during the interval that the feedback pulse width exists, is compared with the integrated error signal to determine the start of the charge pulse. The charge pulse is terminated at the end of each feedback pulse width as shown in FIG. 6

When the sweep voltage ($V_s$) equals the pulse integrator output voltage ($V_c$) the comparator output switches to a logic 1. This occurs at:

$$t_d = \frac{1000 R_2 C_2}{-V_R} (V_c + .7) \text{ Milli-Sec}$$

which is the charge enable delay. The gain or change in this delay for a change in $V_c$ is:

$$G = \frac{dt}{dVc} = \frac{1000 R_2 C_2}{-V_R} \quad V_R = -5.6 \text{ volts}$$

Figure 7:
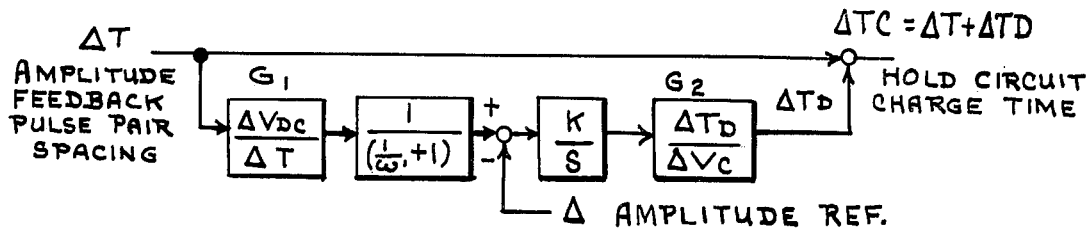
FIG. 7 is a block diagram of the pulse width descriminator.

The block diagram of the pulse width discriminator is shown in FIG. 7. Assuming that the system is in a steady state regulation condition, the waveforms will be as shown in the solid lines of FIG. 8. If pendulum amplitude is suddenly increased by a fixed amount, the time spacing between the pulses of each amplitude feedback pair is also increased by $\Delta T$ as shown in dashed lines. This wider input pulse width causes an immediate increase of $\Delta T$ in the output change time. This corresponds to an output directly proportional to the input due to the feedforward path. In addition, it increases the DC voltage into the pulse integrator causing its output $V_c$ to ramp down toward zero continually decreasing $T_D$ by $\Delta T_D$ as long as the increase $\Delta T$ exists as shown in cross hatched lines. This corresponds to an output that is proportional to the integral of the input.

Figure 8:
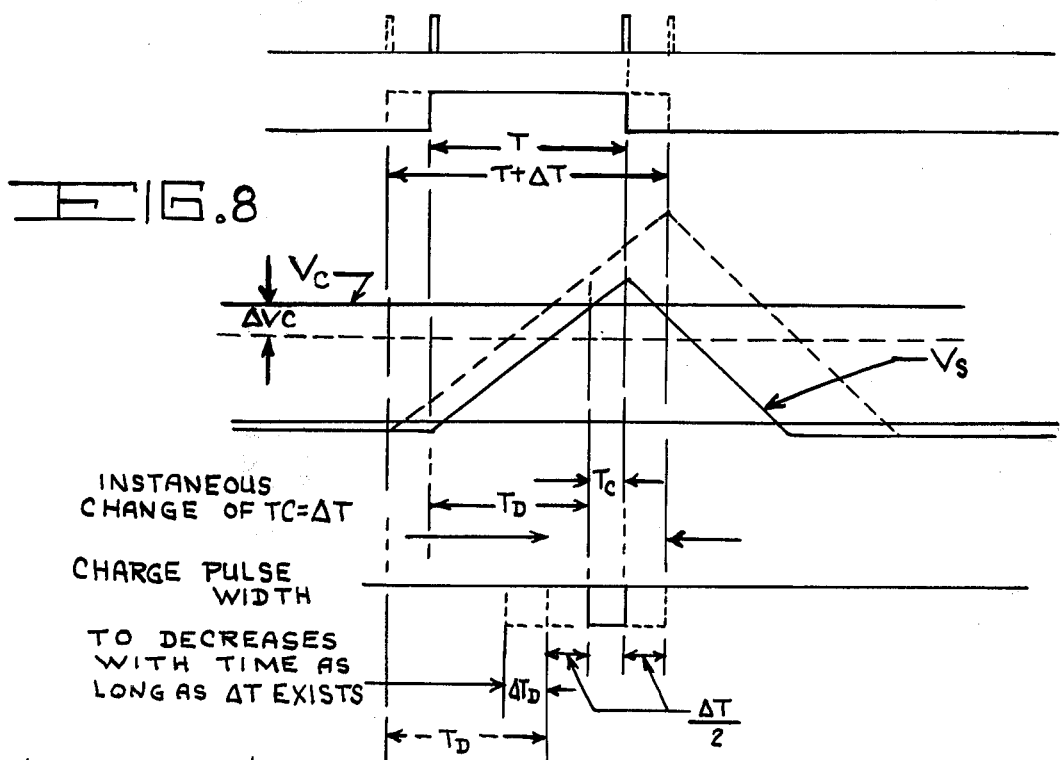
FIG. 8 is a graphical representation of the steady state waveforms of the pulse width descriminator.

Therefore, the pulse width discriminator has the form of $\Delta TD \cong \Delta T(1 + K/S)$. In FIG. 8 dashed lines are used to indicate the change from steady state operation.

From the block diagram of FIG. 7 the transfer function is found to be:

$$\frac{\Delta T_c}{\Delta T} = 1 + \frac{G_1 G_2 K}{S(\frac{S}{W_1} + 1)} = \frac{G_1 G_2 K (\frac{S^2}{W_1 G_1 G_2 K} + \frac{S}{G_1 G_2 K} + 1)}{S(\frac{S}{W_1} + 1)}$$

Figure 9:
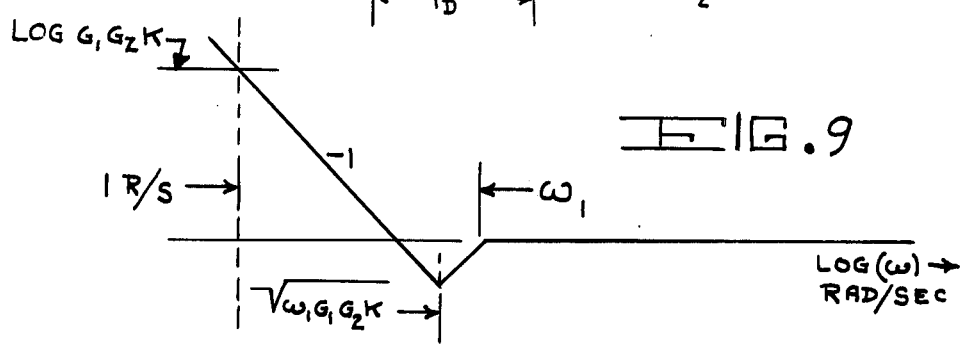
FIG. 9 is a graphical representation of the transfer function of the pulse width discriminator.

A plot of this transfer function in FIG. 9 indicates that it has the characteristic of an integrator (−1 slope) at low frequencies and changes to a constant gain (0 slope) at higher frequencies. Practically in the loop it is equivalent to:

$$\frac{\Delta T_c}{\Delta T} = 1 + \frac{K}{S} = \frac{K(\frac{S}{K} + 1)}{S}$$

The present invention is an automatic amplitude control circuit which provides precision amplitude control of a high Q mechanical torsion pendulum oscillator with high circuit efficiency, a number of low power circuit elements, minimal shaft encoder requirements, and a novel pulse width integrator and stabilization network. This apparatus has provided better than 0.2 milliradian control for a pendulum deflection amplitude of ±1 radian.

Although the invention has been described with reference to a particular embodiment, it will be understood to those skilled in the art that the invention is capable of a variety of alternative embodiments within the spirit and scope of the appended claims.

What is claimed is

1. An amplitude control apparatus for a high Q torsion pendulum comprising in combination:
    an oscillating means providing a pendulum amplitude, said oscillating means utilizing position feedback signals to maintain pendulum amplitude, said position feedback signals occuring each time said oscillating means passes though the zero reference position, and
    an amplitude control means connected to said oscillating means to derive an amplitude signal for each swing of said oscillating means, said amplitude control means comprising said amplitude signal with an amplitude reference voltage, said amplitude signals occurring in pulse pairs, said pulse pairs being transformed to a DC level which is compared with said amplitude reference voltage to provide an amplitude error signal, said amplitude error signal being integrated and transformed into an error pulse having a pulse width representative of said amplitude error signal, said error pulse being applied to said oscillating means to maintain a constant preset pendulum amplitude.

2. An amplitude control apparatus as described in claim 1 wherein said oscillating means comprising in combination:
    a motor and pendulum unit comprising a motor driving a pendulum attached thereto, said motor receiving both motor drive pulses and said error pulse to maintain said pendulum at a constant predetermined pendulum amplitude, a shaft encoding means attached to said motor to provide position feedback signals, said position feedback signals occurring each time said pendulum passes through the zero reference position, and, a pulse width modulator receiving said position feedback signals from said shaft encoding means, said pulse width modulator comprising said position feedback signals with a position reference signal and generating motor drive pulses proportional to the difference therebetween.

3. An amplitude control apparatus as described in claim 1 wherein said pulse width modulator comprising in combination:

a reference ramp generator to receive said position feedback signals from said shaft encoder, said reference ramp generator providing a reference ramp voltage in response to said position feedback signals, said reference ramp voltage being symmetrical about zero, and, a comparator/motor driver comparing said reference ramp voltage with a control voltage said comparator/motor driver provides a motor drive voltage when said reference ramp voltage exceeds said control voltage, said motor drive voltage having a polarity determined by the polarity of said reference ramp voltage.

4. An amplitude control apparatus as described in claim 2 wherein said motor comprises a brushless DC torque motor.

5. An amplitude control apparatus as described in claim 2 wherein said amplitude control means comprises in combination:

a stabilization network receiving an amplitude feedback pulse from said shaft encoding means, said stabilization network integrates said amplitude feedback pulse to extract a DC value therefrom and subtracts said DC value from an amplitude reference voltage to obtain a resultant error, said result error being integrated to provide a charge pulse, and, a pulse converter unit to receive said charge pulse, said charge pulse being converted to a control voltage, said control voltage being applied to said pulse width modulator.

6. An amplitude control apparatus as described in claim 5 wherein said stabilization network comprises in combination:

a flip-flop unit to receive said amplitude feedback pulse, said flip-flop unit providing an output pulse proportional to said amplitude feedback pulse, a pulse integrator unit to receive said output, said pulse integrator integrating said output pulse to provide an amplitude voltage, a sweep integrator unit connected to said flip-flop unit to receive the compliment of said output pulse, said compliment output pulse being integrated and compared with a reference voltage, said sweep integrator unit providing a sweep voltage, a comparator means receiving both said amplitude voltage and said sweep voltage, said comparator unit providing a start charge pulse, and logic means receiving both said output pulse and said start charge pulse, said logic means providing said charge pulse.

* * * * *